US010724896B2

(12) United States Patent
Sugimoto et al.

(10) Patent No.: US 10,724,896 B2
(45) Date of Patent: Jul. 28, 2020

(54) OIL VIBRATION DIAGNOSIS APPARATUS AND OIL VIBRATION DIAGNOSIS METHOD

(71) Applicant: Nidec Tosok Corporation, Zama-shi, Kanagawa (JP)

(72) Inventors: Yoshihisa Sugimoto, Zama (JP); Motohiro Sumiyoshi, Zama (JP); Toshimitsu Miyao, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 284 days.

(21) Appl. No.: 15/768,184

(22) PCT Filed: Oct. 14, 2016

(86) PCT No.: PCT/JP2016/080458
§ 371 (c)(1),
(2) Date: Apr. 13, 2018

(87) PCT Pub. No.: WO2017/065249
PCT Pub. Date: Apr. 20, 2017

(65) Prior Publication Data
US 2018/0321079 A1  Nov. 8, 2018

(30) Foreign Application Priority Data

Oct. 14, 2015 (JP) .................... 2015-203046
Jun. 3, 2016 (JP) .................... 2016-111467

(51) Int. Cl.
*F15B 19/00* (2006.01)
*G01H 3/10* (2006.01)
(Continued)

(52) U.S. Cl.
CPC ............. *G01H 3/10* (2013.01); *F15B 19/005* (2013.01); *F15B 20/00* (2013.01); *F16H 61/12* (2013.01);
(Continued)

(58) Field of Classification Search
CPC ........ G01H 3/10; G01M 99/00; F15B 19/005; F15B 13/0442; F15B 21/008; F15B 2211/6306; F15B 2211/6343; F15B 2211/857; F15B 2211/8613; F15B 2211/8616; F15B 20/00; F16H 61/12; F16H 61/0021; F16H 63/40; F16H 59/72; F16H 2061/0021; F16H 2061/1208; F16H 2061/1264
See application file for complete search history.

(56) References Cited

U.S. PATENT DOCUMENTS 4,781,080 A * 11/1988 Iwatsuki ............. F16H 61/0021
  477/161
8,831,843 B2 * 9/2014 Kamio ................ F16K 31/0675
  701/58
(Continued)

FOREIGN PATENT DOCUMENTS

JP  49-030901 A  3/1974
JP  63-106382 A  5/1988
(Continued)

*Primary Examiner* — David J Bolduc
(74) *Attorney, Agent, or Firm* — Keating & Bennett

(57) ABSTRACT

First, the pressure of oil within an oil passage in a control valve device is measured. Then, an amplitude and period of pressure fluctuations are detected on the basis of an obtained measurement result, and an oil vibration state or an oil non-vibration state is diagnosed. In this case, when the amplitude is greater than a reference amplitude value and when the period is less than a reference period value, the oil vibration state is diagnosed. Further, a duration time of the oil vibration state is determined on the basis of a diagnostic result. Then, when the oil vibration state continues for a period greater than or equal to a reference time, warning information is output. In this way, warning information is output stepwise in accordance with occurrence or continuation of oil vibration.

22 Claims, 10 Drawing Sheets

(51) Int. Cl.
*F16H 61/12* (2010.01)
*G01M 99/00* (2011.01)
*F16H 63/40* (2006.01)
*F15B 20/00* (2006.01)
*F16H 61/00* (2006.01)
*F16H 59/72* (2006.01)
*F15B 21/00* (2006.01)
*F15B 13/044* (2006.01)

(52) U.S. Cl.
CPC ............ *F16H 63/40* (2013.01); *G01M 99/00* (2013.01); *F15B 13/0442* (2013.01); *F15B 21/008* (2013.01); *F15B 2211/6306* (2013.01); *F15B 2211/6343* (2013.01); *F15B 2211/857* (2013.01); *F15B 2211/8613* (2013.01); *F15B 2211/8616* (2013.01); *F16H 59/72* (2013.01); *F16H 61/0021* (2013.01); *F16H 2061/1208* (2013.01); *F16H 2061/1264* (2013.01)

(56) References Cited

U.S. PATENT DOCUMENTS

| | | | |
|---|---|---|---|
| 2005/0064982 A1* | 3/2005 | Kaizu | F16H 61/0204 475/275 |
| 2007/0130933 A1* | 6/2007 | Yoshino | F15B 11/006 60/469 |
| 2009/0222179 A1* | 9/2009 | Zheng | G05D 16/2013 701/58 |
| 2009/0260352 A1* | 10/2009 | Wu | F15B 1/021 60/327 |
| 2011/0179783 A1* | 7/2011 | Pirri | E02F 9/2207 60/420 |
| 2012/0186655 A1* | 7/2012 | Smirnov | G05D 7/0635 137/1 |
| 2014/0297137 A1* | 10/2014 | Kinoshita | F15B 19/005 701/51 |
| 2016/0070272 A1* | 3/2016 | Sugimoto | G05D 7/0635 700/282 |
| 2016/0131248 A1* | 5/2016 | Mizuno | F16H 61/0202 701/51 |
| 2016/0178053 A1* | 6/2016 | Sugimoto | F16H 61/0025 701/58 |
| 2016/0223075 A1* | 8/2016 | Shimazu | F16H 61/12 |
| 2017/0002924 A1* | 1/2017 | Honma | F16H 61/662 |
| 2017/0211691 A1* | 7/2017 | Takahashi | F16H 61/12 |
| 2017/0211697 A1* | 7/2017 | Suwabe | F16H 61/12 |

FOREIGN PATENT DOCUMENTS

| | | |
|---|---|---|
| JP | 02-168004 A | 6/1990 |
| JP | 03-260404 A | 11/1991 |

* cited by examiner

D2

| | DIAGNOSTIC INFORMATION |
|---|---|
| NO OIL VIBRATION | OIL VIBRATION WITHIN NORMAL RANGE |
| ZEROTH LEVEL | |
| FIRST LEVEL | FIRST WARNING INFORMATION (SMALL OIL VIBRATION → COUNTERMEASURE PROCESS TIME: t1) |
| SECOND LEVEL — NO CONTINUATION | |
| SECOND LEVEL — CONTINUATION | SECOND WARNING INFORMATION (LARGE OIL VIBRATION → COUNTERMEASURE PROCESS TIME: t2) |

Fig.3

OIL VIBRATION DIAGNOSIS APPARATUS AND OIL VIBRATION DIAGNOSIS METHOD

BACKGROUND OF THE INVENTION

1. Field of the Invention

The present invention relates to an oil vibration diagnosis apparatus and an oil vibration diagnosis method for diagnosing occurrence of oil vibration within an oil passage in a control valve device.

2. Description of the Related Art

Operations of an automatic transmission in an automobile are controlled by oil supplied from a fluid delivery pump through a control valve device. The control valve device contains an electromagnetic valve for switching flow rates of oil. The electromagnetic valve adjusts a flow rate of oil passing through the oil passage by causing a plunger to move in accordance with a drive current supplied to a solenoid. However, when the electromagnetic valve is driven, there occurs an issue in that oil pulsates within the oil passage in the control valve device, called oil vibration. When oil vibration occurs, the control valve device and the body of the automobile vibrate, which may make the driver feel uncomfortable.

When oil vibration is likely to occur, the control valve device is subjected to a countermeasure process for oil vibration reduction. To appropriately perform this countermeasure process, there is a need for a technique to appropriately diagnose occurrence of oil vibration. A technique for measuring pulsation of oil is described in, for example, Japanese Unexamined Patent Application Publication No. 63-106382.

In Japanese Unexamined Patent Application Publication No. 63-106382, however, the magnitude of pulsation of oil is measured and whether the obtained magnitude of the pulsation falls within a normal range is judged using a binary form. If the magnitude of pulsation of oil does not fall within the normal range, warning display is provided to a display unit (line 20 in the lower right column of page 2 to line 9 in the upper left column of page 3). The method in this publication therefore does not make it possible to perform a countermeasure process for oil pulsation reduction stepwise on the basis of the warning display provided on the display unit. In addition, the method in this publication does not make it possible to recognize continuation of oil vibration that has occurred and therefore does not make it possible to perform a countermeasure process accordingly.

SUMMARY OF THE INVENTION

It is an object of the present invention to provide an oil vibration diagnosis apparatus and an oil vibration diagnosis method that can determine occurrence and continuation of oil vibration within an oil passage in a control valve device and can output warning information stepwise accordingly.

A first exemplary aspect of the invention provides an oil vibration diagnosis apparatus for diagnosing occurrence of oil vibration within an oil passage in a control valve device. The oil vibration diagnosis apparatus includes a pressure sensor that measures a pressure of oil within the oil passage, an amplitude detection unit that detects an amplitude of pressure fluctuations on the basis of a measurement result of the pressure sensor, a period detection unit that detects a period of pressure fluctuations on the basis of the measurement result of the pressure sensor, a diagnosis unit that diagnoses an oil vibration state or an oil non-vibration state on the basis of the amplitude and the period, an oil vibration state duration time determination unit that determines a duration time of the oil vibration state on the basis of a diagnostic result of the diagnosis unit, and an output unit that outputs information on the basis of a determination result of the oil vibration state duration time determination unit. The diagnosis unit diagnoses the oil vibration state when the amplitude is greater than a reference amplitude value and when the period is less than a reference period value, and the output unit outputs warning information when the oil vibration state duration time determination unit determines continuation of the oil vibration state for a period greater than or equal to a first reference time.

A second exemplary aspect of the invention provides an oil vibration diagnosis method for diagnosing occurrence of oil vibration within an oil passage in a control valve device. The oil vibration diagnosis method includes a step (a) of measuring a pressure of oil within the oil passage, a step (b) of detecting an amplitude of pressure fluctuations on the basis of a measurement result obtained in the step (a), a step (c) of detecting a period of pressure fluctuations on the basis of the measurement result obtained in the step (a), a step (d) of diagnosing an oil vibration state or an oil non-vibration state on the basis of the amplitude obtained in the step (b) and on the basis of the period obtained in the step (c), a step (e) of determining a duration time of the oil vibration state on the basis of a diagnostic result in the step (d), and a step (f) of outputting information on the basis of a determination result in the step (e). In the step (d), the oil vibration state is diagnosed when the amplitude is greater than a reference amplitude value and when the period is less than a reference period value. In the step (f), warning information is output when continuation of the oil vibration state for a period greater than or equal to a first reference time is determined in the step (e).

According to the first and second exemplary aspects of the invention, warning information can be output stepwise in accordance with occurrence and continuation of oil vibration. Thus, a manufacturer of the control valve device, a manufacturer of transportation equipment in which the control valve device is mounted, a user of the transportation equipment, or a maintenance engineer can perform a countermeasure process in accordance with the warning information.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a diagram illustrating an example of table data.

DETAILED DESCRIPTION OF THE PREFERRED EMBODIMENTS

An exemplary embodiment of the present invention will be described hereinafter with reference to the drawings.

Figure 1:
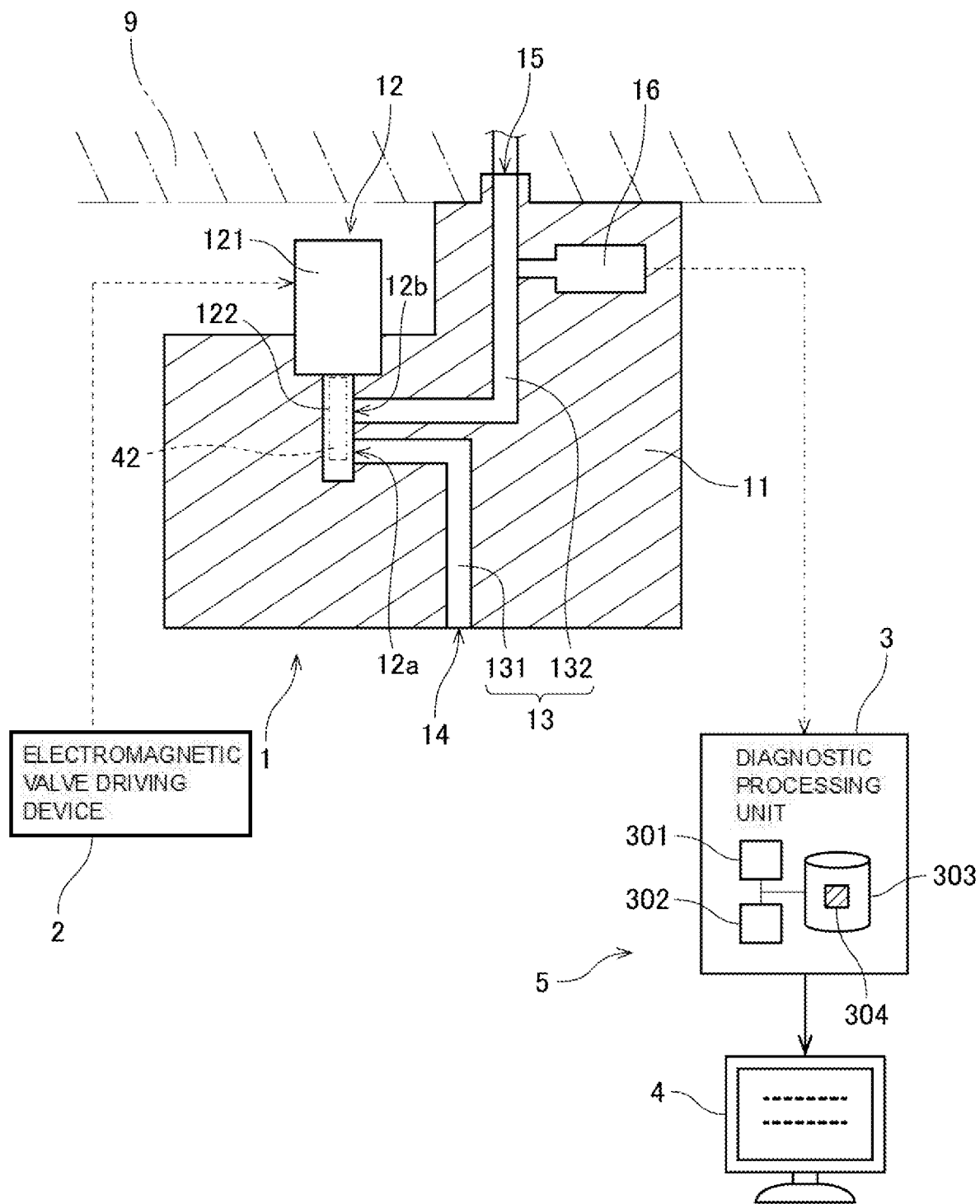
FIG. 1 is a diagram illustrating an example of a control valve device.

FIG. 1 is a diagram illustrating an example of a control valve device 1 to be diagnosed by an oil vibration diagnosis apparatus. The control valve device 1 is a device that is mounted in transportation equipment such as an automobile and that supplies oil (automatic transmission fluid (ATF)) to an automatic transmission 9 in the transportation equipment to control the driving of the automatic transmission 9. As illustrated in FIG. 1, the control valve device 1 includes a valve body 11 formed by aluminum die-casting or the like, and an electromagnetic valve 12.

Within the valve body 11, a plurality of oil passages 13 are formed which serve as flow channels for oil. The plurality of oil passages 13 are complicatedly interlaced within the valve body 11. Note that, in FIG. 1, only some of the plurality of oil passages 13 are conceptually illustrated for easy understanding. In the example in FIG. 1, the control valve device 1 is attached to a lower surface of the automatic transmission 9. The oil passages 13 are formed between an oil introducing opening 14 in a lower surface of the valve body 11 and an oil transfer opening 15 in an upper surface of the valve body 11.

The electromagnetic valve 12 is a so-called proportional electromagnetic valve whose degree of opening can be continuously changed in accordance with a drive current supplied from an electromagnetic valve driving device 2. The electromagnetic valve 12 has a body portion 121 and a nozzle portion 122. The nozzle portion 122 substantially cylindrically projects downward from the body portion 121. The nozzle portion 122 is disposed within the valve body 11 in such a manner as to be inserted in the middle of the paths of the oil passages 13. The nozzle portion 122 has in a side surface thereof an oil input port 12a and an oil output port 12b.

When a drive current is supplied from the electromagnetic valve driving device 2 to a solenoid (not illustrated) in the body portion 121, a cylindrical spool 42 disposed in the nozzle portion 122 moves up and down. Accordingly, the state of communication between the oil input port 12a and the oil output port 12b is switched. As a result, the flow rate of oil supplied from the control valve device 1 to the automatic transmission 9 changes. The electromagnetic valve driving device 2 is implemented by using, for example, a circuit board having a plurality of electronic components. Note that some or all of the functions of the electromagnetic valve driving device 2 may be implemented by using a microcontroller or a general-purpose computer.

In the following, a portion of the oil passages 13 on the input side relative to the nozzle portion 122 is referred to as a first oil passage 131. Further, a portion of the oil passages on the output side relative to the nozzle portion 122 is referred to as a second oil passage 132. The first oil passage 131 connects the oil introducing opening 14 in the valve body 11 and the oil input port 12a in the nozzle portion 122 to each other. The second oil passage 132 connects the oil output port 12b in the nozzle portion 122 and the oil transfer opening 15 in the valve body 11 to each other. When the control valve device 1 is in use, oil pressurized by an oil pump (not illustrated) is introduced into the first oil passage 131 through the oil introducing opening 14. Further, oil flows between the second oil passage 132 and the automatic transmission 9 through the oil transfer opening 15.

The control valve device 1 further includes a sensor 16 that measures the pressure and temperature of oil. The sensor 16 measures the pressure and temperature of oil within the second oil passage 132 on the output side relative to the nozzle portion 122 of the electromagnetic valve 12. The sensor 16 according to this embodiment has both the function of a pressure sensor that measures the pressure of oil and the function of a temperature sensor that measures the temperature of oil. Note that the second oil passage 132 may be provided with a pressure sensor and a temperature sensor separately.

As illustrated in FIG. 1, the sensor 16 of the control valve device 1 is connected to a diagnostic processing unit 3 to enable communication therebetween. The diagnostic processing unit 3 diagnoses occurrence and continuation of oil vibration within the oil passages 13 in the control valve device 1 on the basis of the measurement results of the sensor 16 and displays a diagnostic result on a display unit 4. In this embodiment, the sensor 16, the diagnostic processing unit 3, and the display unit 4 constitute an oil vibration diagnosis apparatus 5.

As illustrated in FIG. 1, the diagnostic processing unit according to this embodiment is constituted by a computer including an arithmetic processing unit 301 such as a CPU, a memory 302 such as a RAM, and a storage unit 303 such as a hard disk drive. The storage unit 303 has installed therein a computer program 304 for executing an oil vibration diagnosis process. Note that some or all of the functions of the diagnostic processing unit 3 may be implemented by using an electrical circuit including an arithmetic processing unit such as a microcontroller.

The diagnostic processing unit 3 may be incorporated in an inspection device that is used in the manufacturing process of the control valve device 1 or the transportation equipment or may be mounted in the transportation equipment itself, such as an automobile. When the diagnostic processing unit 3 is mounted in the transportation equipment, for example, the function of the diagnostic processing unit 3 may be incorporated in a transmission control unit (TCU) that controls the automatic transmission 9. Alternatively, the diagnostic processing unit 3 may be a device operated by a maintenance engineer during the maintenance of the transportation equipment.

Figure 2:
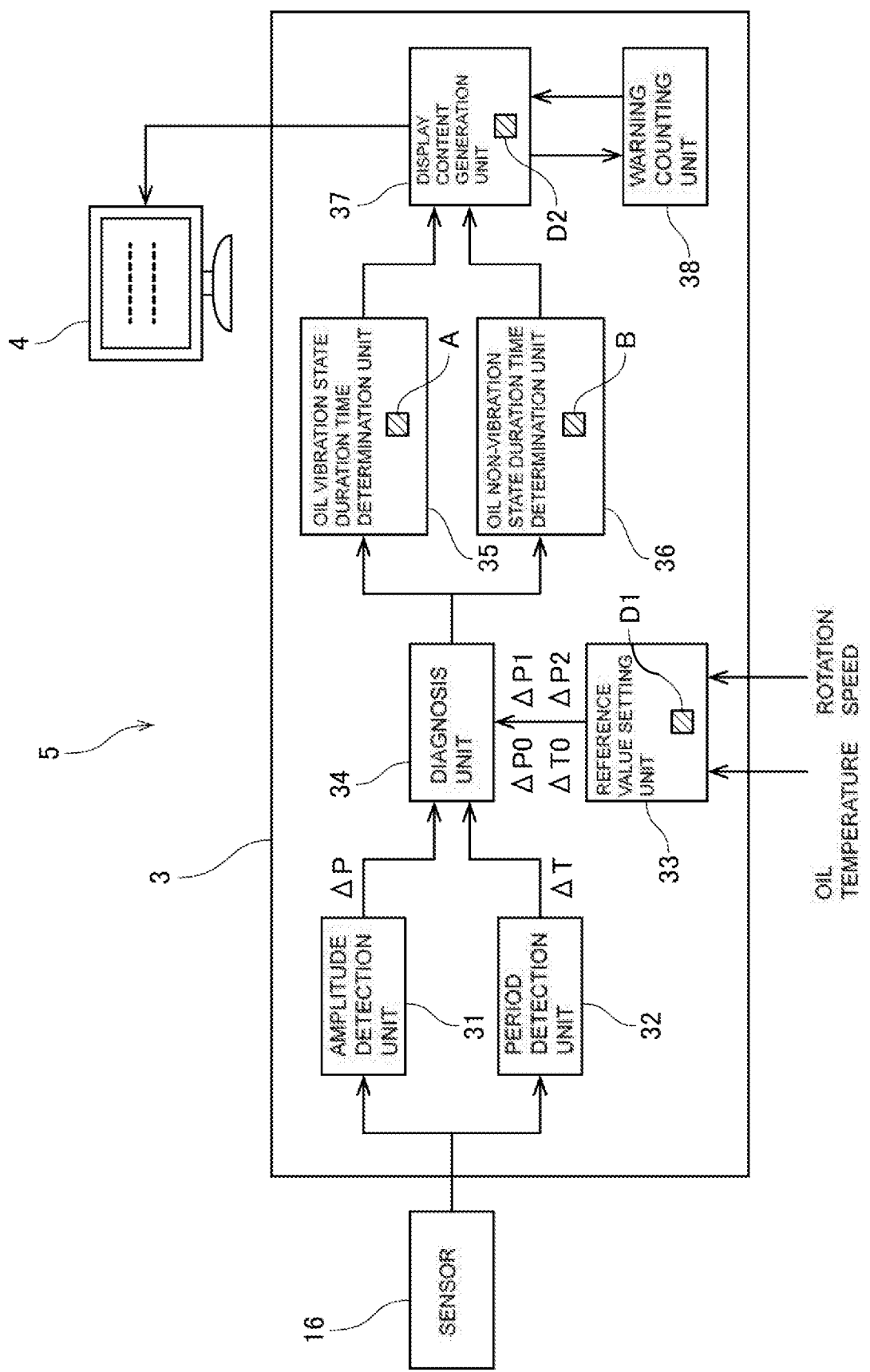
FIG. 2 is a block diagram conceptually illustrating the functions of an oil vibration diagnosis apparatus.

FIG. 2 is a block diagram conceptually illustrating the functions of the oil vibration diagnosis apparatus 5. As illustrated in FIG. 2, the diagnostic processing unit 3 according to this embodiment includes an amplitude detection unit 31, a period detection unit 32, a reference value setting unit 33, a diagnosis unit 34, an oil vibration state duration time determination unit 35, an oil non-vibration state duration time determination unit 36, a display content generation unit 37, and a warning counting unit 38. The functions of these components are implemented by a computer, which serves as the diagnostic processing unit 3, operating in accordance with the computer program 304 described above.

The amplitude detection unit 31 receives the measurement results of the sensor 16 and detects an amplitude ΔP of pressure fluctuations of oil within the second oil passage 132 on the basis of the obtained measurement results. The pressure measurement result obtained from the sensor 16 changes with time. Thus, the pressure derivative value periodically becomes zero. For example, the amplitude detection unit 31 detects a difference between pressure values at time points when the pressure derivative value is zero as the amplitude ΔP of pressure fluctuations. Note that the amplitude detection unit 31 may detect the amplitude ΔP of pressure fluctuations from the measurement results of the sensor 16 by using any other method.

The period detection unit 32 receives the measurement results of the sensor 16 and detects a period ΔT of pressure fluctuations of oil within the second oil passage 132 on the basis of the obtained measurement results. As described above, the pressure measurement result obtained from the sensor 16 changes with time. Thus, the pressure derivative value periodically becomes zero. For example, the period detection unit 32 detects a time interval between time points when the pressure derivative value is zero as the period ΔT of pressure fluctuations. Note that the period detection unit 32 may detect the period ΔT of pressure fluctuations from the measurement results of the sensor 16 by using any other method.

The reference value setting unit 33 sets a zeroth reference amplitude value ΔP0, a zeroth reference period value ΔT0, a first reference amplitude value ΔP1, and a second reference amplitude value ΔP2, which are to be referred to by the diagnosis unit 34. The zeroth reference amplitude value ΔP0 and the zeroth reference period value ΔT0 are reference values for determining whether oil vibration has occurred. The first reference amplitude value ΔP1 and the second reference amplitude value ΔP2 are reference values for determining which of zeroth to second levels an oil vibration level is when oil vibration has occurred. The first reference amplitude value ΔP1 is greater than the zeroth reference amplitude value ΔP0. The second reference amplitude value ΔP2 is further greater than the first reference amplitude value ΔP1.

The zeroth reference amplitude value ΔP0 and the zeroth reference period value ΔT0 are held in the reference value setting unit 33 as fixed values, for example. Note that the zeroth reference amplitude value ΔP0 and the zeroth reference period value ΔT0 may be made to fluctuate in accordance with a condition such as the temperature of oil.

The reference value setting unit 33 acquires from the sensor 16 information on the temperature of oil within the second oil passage 132. The reference value setting unit 33 further acquires information on the rotation speed of an engine via an in-vehicle communication medium such as a controller area network (CAN). Further, the reference value setting unit 33 holds map data D1 in advance, which specifies a correspondence relationship among the temperature of oil, the rotation speed of the engine, the first reference amplitude value ΔP1, and the second reference amplitude value ΔP2. The reference value setting unit 33 refers to the map data D1 and determines the values corresponding to the temperature of oil and the rotation speed of the engine as the first reference amplitude value ΔP1 and the second reference amplitude value ΔP2. Note that the first reference amplitude value ΔP1 and the second reference amplitude value ΔP2 may be determined on the basis of other conditions. Further, the first reference amplitude value ΔP1 and the second reference amplitude value ΔP2 may be fixed values.

The diagnosis unit 34 diagnoses the presence or absence of oil vibration, that is, an oil vibration state in which oil vibration has occurred or an oil non-vibration state in which no oil vibration has occurred, on the basis of the amplitude ΔP of pressure fluctuations detected by the amplitude detection unit 31 and the period ΔT of pressure fluctuations detected by the period detection unit 32. When the oil vibration state is obtained, that is, when oil vibration has occurred, the diagnosis unit 34 diagnoses the oil vibration level. When the amplitude ΔP of pressure fluctuations is greater than the zeroth reference amplitude value ΔP0 and the period ΔT of pressure fluctuations is smaller than the zeroth reference period value ΔT0, the diagnosis unit 34 judges a state in which oil vibration has occurred, that is, the oil vibration state. When the amplitude ΔP of pressure fluctuations is less than or equal to the zeroth reference amplitude value ΔP0 or the period ΔT of pressure fluctuations is greater than or equal to the zeroth reference period value ΔT0, the diagnosis unit 34 judges a state in which no oil vibration has occurred, that is, the oil non-vibration state. If oil vibration is judged to have occurred, the diagnosis unit 34 diagnoses any one of three levels, namely, a zeroth level, a first level, and a second level, as the oil vibration level on the basis of the relationships in magnitude between the amplitude ΔP of pressure fluctuations and the first reference amplitude value ΔP1 and between the amplitude ΔP of pressure fluctuations and the second reference amplitude value ΔP2. Note that the diagnosis of the oil vibration level may be omitted.

The oil vibration state duration time determination unit 35 determines the duration time of the oil vibration state on the basis of the diagnostic result obtained by the diagnosis unit 34. For example, when the diagnosis unit 34 makes a diagnosis that oil vibration with the second level has occurred, the oil vibration state duration time determination unit 35 updates an internal counter A. When the counter A is continuously updated for a period greater than or equal to a first reference time Na, the oil vibration state duration time determination unit 35 determines that oil vibration with the second level continues for a period greater than or equal to the first reference time Na.

The oil non-vibration state duration time determination unit 36 determines the duration time of the oil non-vibration state on the basis of the diagnostic result obtained by the diagnosis unit 34. For example, when the diagnosis unit 34 makes a diagnosis that no oil vibration has occurred, the oil non-vibration state duration time determination unit 36 updates an internal counter B. When the counter B is continuously updated for a period greater than or equal to a second reference time Nb, the oil non-vibration state duration time determination unit 36 determines that a state in which no oil vibration occurs continues for a period greater than or equal to the second reference time Nb.

A diagnostic process performed by the diagnosis unit 34 and determination processes performed by the oil vibration state duration time determination unit 35 and the oil non-vibration state duration time determination unit 36 will be described in detail below.

The display content generation unit 37 generates diagnostic information to be displayed on the display unit 4, on the basis of the diagnostic result obtained by the diagnosis unit and the determination results of the oil vibration state duration time determination unit 35 and the oil non-vibration state duration time determination unit 36. The display content generation unit 37 has table data D2 indicating correspondence relationships between the oil vibration levels and the diagnostic information. FIG. 3 is a diagram illustrating an example of the table data D2. As in FIG. 3, the table data D2 specifies diagnostic information to be displayed for the respective cases of no oil vibration, the zeroth level, the first level, and the second level and, furthermore, for the cases where oil vibration with the second level continues and does not continue. The display content generation unit 37 causes the display unit 4 to display the presence or absence of oil vibration, an oil vibration level, information corresponding to continuation of the oil vibration state, and warning information on the basis of the table data D2.

In the example in FIG. 3, when no oil vibration has occurred or when the oil vibration level is the zeroth level, diagnostic information "oil vibration within normal range", which indicates that oil vibration is within the normal range, is generated. When the oil vibration level is the first level, diagnostic information "first warning information (small oil vibration→countermeasure process time: t1)" is generated. When the oil vibration level is the second level and, furthermore, oil vibration with the second level continues for a period greater than or equal to the first reference time Na, diagnostic information "second warning information (large oil vibration→countermeasure process time: t2)" is generated. In this way, the diagnostic information generated by the display content generation unit 37 includes warning information having two or more levels. Further, each of the first warning information and the second warning information includes a "countermeasure process time", which is numerical information necessary for a countermeasure process described below to reduce the oil vibration level. In this way, the level with which oil vibration has occurred or continuation of oil vibration is diagnosed and warning information is output in accordance with the level or continuation, thus enabling more detailed recognition of the necessity of maintenance. This enables more detailed measures to be taken against oil vibration.

If the oil non-vibration state in which no oil vibration occurs or the oil vibration level is the zeroth level continues for a period greater than or equal to the second reference time Nb after the diagnostic information "first warning information (small oil vibration→countermeasure process time: t1)" or "second warning information (large oil vibration→countermeasure process time: t2)" has been generated, it is determined that the oil vibration state has exited. In this case, the output diagnostic information "first warning information (small oil vibration→countermeasure process time: t1)" or "second warning information (large oil vibration→countermeasure process time: t2)" is removed. Instead of the removal of diagnostic information or in addition to the removal of diagnostic information, "warning cancellation information" may be displayed. The details will be described below.

The display unit 4 is implemented using a display device such as a liquid crystal display. The display unit 4 may be a display unit of an inspection device used in the manufacturing process of the control valve device 1 or the transportation equipment. Alternatively, the display unit 4 may be a portion of an instrument panel at the driver's seat of the transportation equipment. In this embodiment, the display content generation unit 37 and the display unit 4 constitute an output unit that outputs diagnostic information. Note that the output unit may not necessarily be configured to visually display diagnostic information on a screen. The output unit may be configured to output diagnostic information by means such as audio, light, vibration, or printing.

The warning counting unit 38 counts the number of times warning information has been output from the display content generation unit 37. As described below, when warning information is displayed on the display unit 4, the manufacturer of the control valve device 1, the manufacturer of the transportation equipment, the user of the transportation equipment, or a maintenance engineer executes a countermeasure process for reducing oil vibration. Then, the diagnostic processing unit 3 again diagnoses the control valve device 1, which has been subjected to the countermeasure process, for occurrence of oil vibration. The warning counting unit 38 counts the number of times the first warning information has been output and the number of times the second warning information has been output in the diagnostic process repeatedly executed in the way described above. If the number of counts of the same warning information by the warning counting unit 38 exceeds a preset threshold, the display content generation unit 37 outputs alert information different from the first warning information and the second warning information to the display unit 4.

Subsequently, description will be given of a procedure for diagnosing occurrence and continuation of oil vibration in the control valve device 1 and performing a countermeasure process in accordance with a diagnostic result by using the diagnostic processing unit 3 described above. The following oil vibration diagnosis is performed, for example, as one of the pre-shipment inspections in the manufacturing process of the control valve device 1 or in the manufacturing process of transportation equipment including the control valve device 1. Note that an equivalent oil vibration diagnosis may be executed as appropriate within the transportation equipment when the transportation equipment is in use after shipment. The following oil vibration diagnosis may be performed during the maintenance of the transportation equipment.

Figure 4:
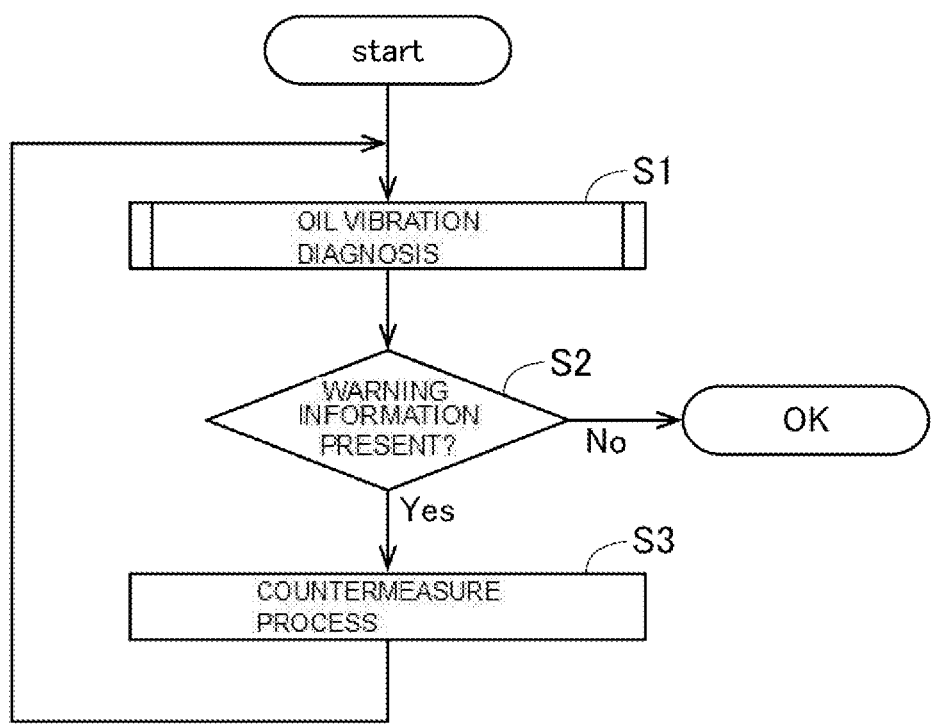
FIG. 4 is a flowchart illustrating the flow of an oil vibration diagnosis and a countermeasure process.

FIG. 4 is a flowchart illustrating the flow of an oil vibration diagnosis and a countermeasure process. In order to diagnose occurrence and continuation of oil vibration, first, a drive current is supplied from the electromagnetic valve driving device 2 to the electromagnetic valve 12 to activate the electromagnetic valve 12. Then, the sensor 16 measures the pressure and temperature of oil within the second oil passage 132 with the electromagnetic valve 12 being activated. Then, occurrence and continuation of oil vibration within the second oil passage 132 are diagnosed on the basis of the obtained measurement results (step S1).

Figure 5:
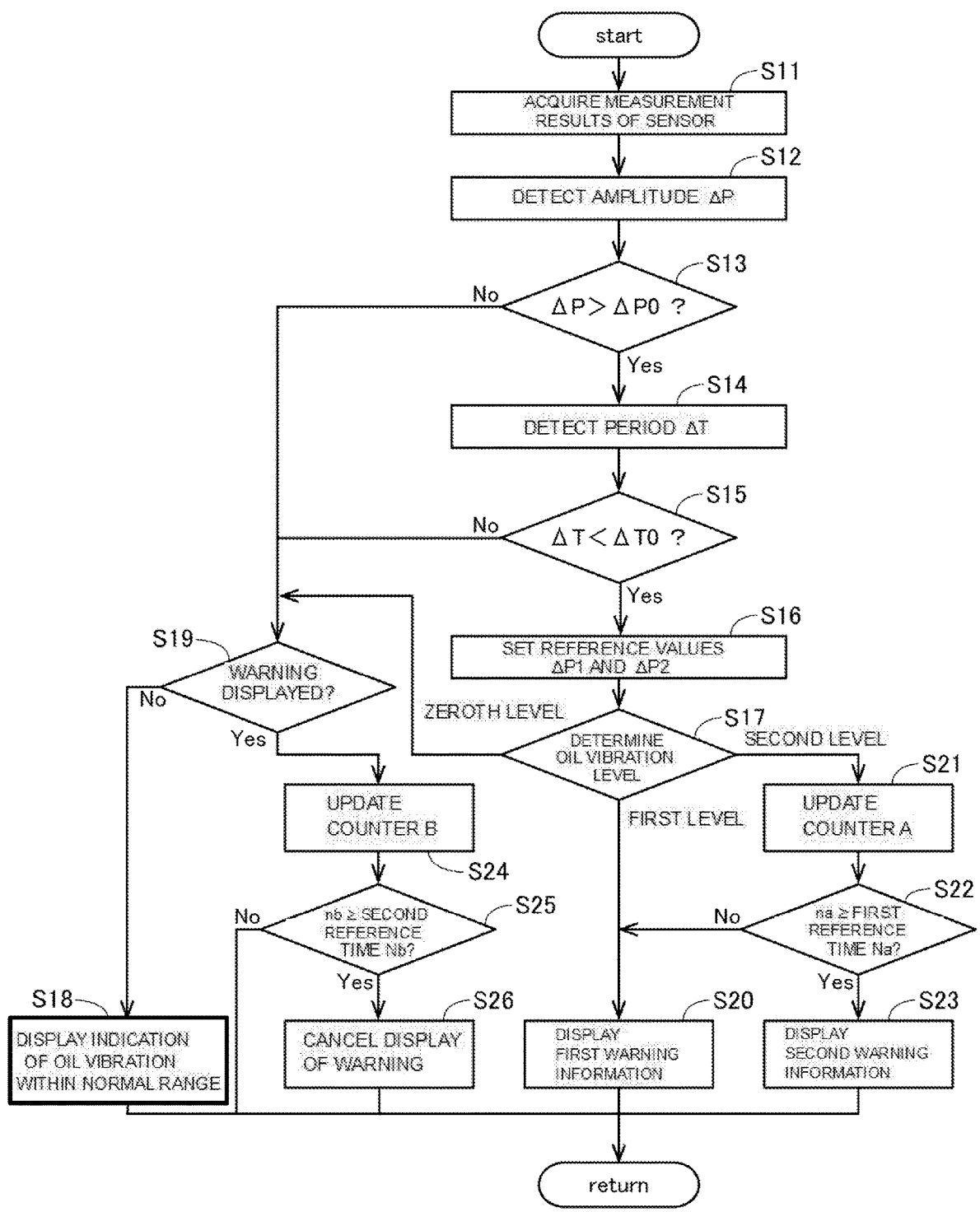
FIG. 5 is a flowchart illustrating the details of the oil vibration diagnosis.

FIG. 5 is a flowchart illustrating the details of the oil vibration diagnosis in step S1. In order to perform an oil vibration diagnosis, first, the diagnostic processing unit 3 acquires the measurement results of the pressure and temperature of oil from the sensor 16 (step S11). The measurement results of the sensor 16 are respectively input to the amplitude detection unit 31 and the period detection unit 32 in the diagnostic processing unit 3.

The amplitude detection unit 31 detects an amplitude $\Delta P$ of pressure fluctuations of oil on the basis of the input measurement results (step S12). As described above, the amplitude detection unit 31 may use a difference between pressure values at time points when the derivative value of the pressure value is zero as the amplitude $\Delta P$ or may calculate the amplitude $\Delta P$ by using any other method. When the amplitude $\Delta P$ of pressure fluctuations is calculated, the diagnosis unit 34 determines whether the obtained amplitude $\Delta P$ is greater than the zeroth reference amplitude value $\Delta P0$ (step S13). When the amplitude $\Delta P$ is less than or equal to the zeroth reference amplitude value $\Delta P0$ (when No is determined in step S13), it is judged that no oil vibration has occurred.

On the other hand, when the amplitude $\Delta P$ is greater than the zeroth reference amplitude value $\Delta P0$ (when Yes is determined in step S13), the period detection unit 32 detects a period $\Delta T$ of pressure fluctuations of oil on the basis of the measurement results from the sensor 16 (step S14). As described above, the period detection unit 32 may use a time interval between time points when the derivative value of the pressure value is zero as the period $\Delta T$ of pressure fluctuations or may calculate the period $\Delta T$ of pressure fluctuations by using any other method. When the period $\Delta T$ of pressure fluctuations is calculated, the diagnosis unit 34 determines whether the obtained period $\Delta T$ is smaller than the zeroth reference period value $\Delta T0$ (step S15). When the period $\Delta T$ is greater than or equal to the zeroth reference period value $\Delta T0$ (when No is determined in step S15), it is judged that no oil vibration has occurred.

On the other hand, when the period $\Delta T$ is smaller than the zeroth reference period value $\Delta T0$ (when Yes is determined in step S15), it is judged that oil vibration has occurred. In this case, the reference value setting unit 33 sets the first reference amplitude value $\Delta P1$ and the second reference amplitude value $\Delta P2$ in order to continuously determine the oil vibration level (step S16). The diagnosis unit 34 compares the amplitude $\Delta P$ of pressure fluctuations of oil with the first reference amplitude value $\Delta P1$ and the second reference amplitude value $\Delta P2$ to determine any of the three levels, that is, the zeroth level, the first level, and the second level, as the oil vibration level at that time point (step S17).

In step S17, when the amplitude $\Delta P$ of pressure fluctuations is less than the first reference amplitude value $\Delta P1$, the diagnosis unit 34 determines that the oil vibration level is the "zeroth level". When the amplitude $\Delta P$ of pressure fluctuations is greater than or equal to the first reference amplitude value $\Delta P1$ and is less than the second reference amplitude value $\Delta P2$ greater than the first reference amplitude value $\Delta P1$, the diagnosis unit 34 determines that the oil vibration level is the "first level". When the amplitude $\Delta P$ of pressure fluctuations is greater than or equal to the second reference amplitude value $\Delta P2$, the diagnosis unit 34 determines that the oil vibration level is the "second level".

If it is judged in step S13 or step S15 described above that no oil vibration has occurred or if the zeroth level is diagnosed as the oil vibration level in step S17, the display content generation unit 37 refers to the table data D2 and generates the diagnostic information "oil vibration within normal range" corresponding to the diagnostic result. Then, the display content generation unit 37 outputs the diagnostic information to the display unit 4. As a result, the diagnostic information "oil vibration within normal range" is displayed on the screen of the display unit 4 (step S18).

Here, as illustrated in FIG. 5, before the display content generation unit 37 generates the diagnostic information "oil vibration within normal range", it is checked whether there is warning information that has already been generated and the content of such warning information is checked (step S19). If warning information has already been generated, the diagnostic information "oil vibration within normal range" is not newly generated but the already displayed warning information is removed or other operation is performed under a specific condition. The details will be described below.

Then, if the first level is diagnosed as the oil vibration level in step S17 described above, the display content generation unit 37 refers to the table data D2 and generates the diagnostic information "first warning information (small oil vibration→countermeasure process time: t1)" corresponding to the diagnostic result. Then, the display content generation unit 37 outputs the diagnostic information to the display unit 4. As a result, the diagnostic information "first warning information (small oil vibration→countermeasure process time: t1)" is displayed on the screen of the display unit 4 (step S20).

On the other hand, if the second level is diagnosed as the oil vibration level in step S17 described above, the counter A in the oil vibration state duration time determination unit 35 is updated (step S21). The counter A is updated only when the oil vibration state with the second level is successively diagnosed. If the oil vibration state with the second level is not diagnosed, the counter A is reset. Accordingly, the time duration over which the oil vibration state with the second level continues is determined.

On the basis of the determination result of the duration time of the oil vibration state with the second level by the oil vibration state duration time determination unit 35, the display content generation unit 37 checks whether a duration time na of the oil vibration state with the second level is greater than or equal to the first reference time Na (step S22). If it is checked that the duration time na of the oil vibration state with the second level is greater than or equal to the first reference time Na, the display content generation unit 37 generates determination information "second warning information (large oil vibration→countermeasure process time: t2)". Then, the display content generation unit 37 outputs the determination information to the display unit 4. As a result, the determination information "second warning information (large oil vibration→countermeasure process time: t2)" is displayed on the screen of the display unit 4 (step S23).

Even if a diagnosis that oil vibration with the second level has occurred is made in step S17, when the duration time of the oil vibration state with the second level is below the first reference time Na, as illustrated in FIG. 5, for example, the information "first warning information (small oil vibration-→countermeasure process time: t1)" is displayed. In this case, the "first warning information (small oil vibration-→countermeasure process time: t1)" or information different from the "second warning information (large oil vibration→countermeasure process time: t2)" described above may be displayed.

Referring back to FIG. 4, after the completion of the oil vibration diagnosis in step S1, the manufacturer of the control valve device 1, the manufacturer of transportation equipment in which the control valve device 1 is mounted, the user of the transportation equipment, or a maintenance engineer checks the diagnostic information displayed on the display unit 4. Then, it is judged whether the first warning information or the second warning information is being displayed on the display unit 4 (step S2). When an indication of oil vibration within the normal range, rather than the first warning information or the second warning information, is being displayed on the display unit 4 (when No is determined in step S2), there is no need to reduce the oil vibration. Thus, the countermeasure process for oil vibration reduction is not performed.

When the first warning information or the second warning information is being displayed on the display unit 4 (when Yes is determined in step S2), the manufacturer of the control valve device 1, the manufacturer of the transportation equipment in which the control valve device 1 is mounted, the user of the transportation equipment, or the maintenance engineer executes a countermeasure process for reducing oil vibration (step S3). Specific examples of the countermeasure process include, for example, processes such as performing an air venting operation for removing bubbles in the oil within the second oil passage 132, increasing the period during which the solenoid in the electromagnetic valve 12 is driven, increasing the frequency of the drive current flowing in the solenoid, and temporarily stopping the electromagnetic valve 12 to wait for the oil to come to a stop.

The manufacturer of the control valve device 1, the manufacturer of the transportation equipment in which the control valve device 1 is mounted, the user of the transportation equipment, or the maintenance engineer checks the warning information displayed on the display unit 4 and performs a countermeasure process corresponding to the warning information. In particular, in the oil vibration diagnosis apparatus 5, as described above, warning information having two levels is output in accordance with occurrence and continuation of oil vibration. This enables the manufacturer of the control valve device 1, the manufacturer of the transportation equipment in which the control valve device 1 is mounted, the user of the transportation equipment, or the maintenance engineer to select the level of the countermeasure process in accordance with the degree of oil vibration indicated by the warning information.

In the oil vibration diagnosis apparatus 5 according to this embodiment, furthermore, the "countermeasure process time", which is numerical information necessary for a countermeasure process for reducing the oil vibration level, is displayed together with the first warning information and the second warning information. This enables the manufacturer of the control valve device 1, the manufacturer of the transportation equipment in which the control valve device 1 is mounted, the user of the transportation equipment, or the maintenance engineer to easily execute a countermeasure process for reducing oil vibration in accordance with the numerical information. The numerical information displayed together with warning information is not limited to the "countermeasure process time", and may be other numerical information related to the countermeasure process, such as a voltage value, frequency, or pressure.

When the countermeasure process is completed, the process returns to step S1 and the diagnostic processing unit 3 again performs an oil vibration diagnosis. That is, the processing of steps S11 to S17 is executed again. As a result, if it is judged in step S13 or step S15 that no oil vibration has occurred or if it is determined in step S17 that the oil vibration level is the zeroth level, the process proceeds to step S19. Since the first warning information or the second warning information is continuously being displayed on the display unit 4 at this time point from the time before the countermeasure process is performed, "Yes" is determined in step S19. In this case, the process proceeds to step S24 and the counter B in the oil non-vibration state duration time determination unit 36 is updated. The counter B is updated only when the oil non-vibration state is continuously diagnosed. If the oil non-vibration state is not diagnosed, the counter B is reset. Accordingly, the time duration over which the oil non-vibration state continues is determined.

On the basis of the determination result of the duration time of the oil non-vibration state, the display content generation unit 37 checks whether a duration time nb of the oil non-vibration state is greater than or equal to the second reference time Nb set in advance (step S25). If it is checked that the duration time nb of the oil non-vibration state is greater than or equal to the second reference time Nb, the display content generation unit 37 generates warning cancellation information. Then, the output of the first warning information or the second warning information, which is displayed on the display unit 4 from the time before the countermeasure process is performed, is canceled (step S26).

Figure 6:
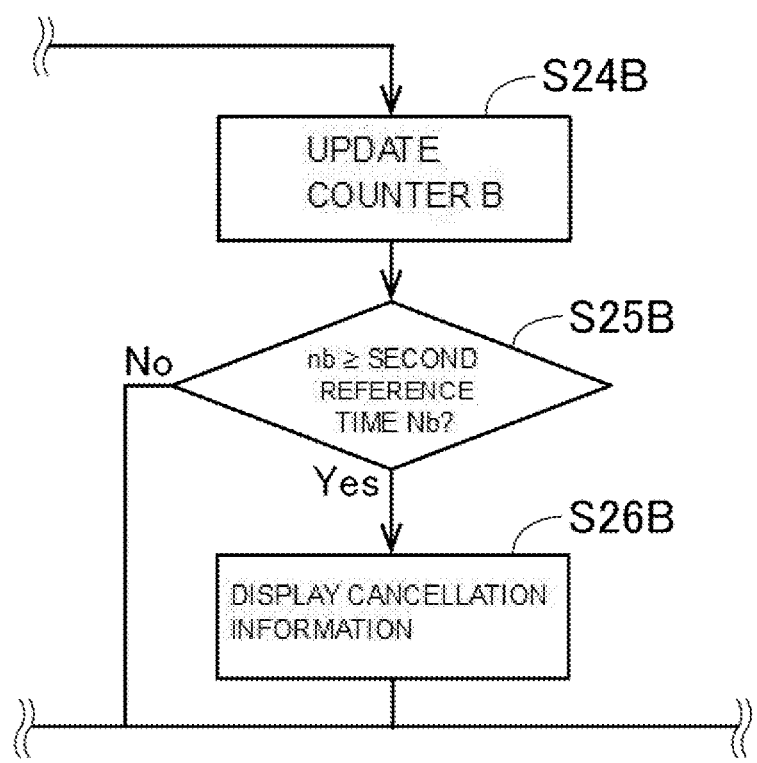
FIG. 6 is a partial flowchart illustrating the details of an oil vibration diagnosis according to a modification.

As illustrated in FIG. 6, if it is checked that the duration time of the oil non-vibration state is greater than or equal to the second reference time Nb, cancellation information may be displayed on the display unit 4 (step S26B), instead of or in addition to the cancelation of the output of the first warning information or the second warning information displayed on the display unit 4. This makes it possible to easily determine whether the countermeasure processing operation is completed.

Here, the second reference time Nb is desirably greater than or equal to the first reference time Na. The second reference time Nb on which the determination of the duration time of the oil non-vibration state is based is set longer than the first reference time Na on which the determination of the duration time of the oil vibration state is based, which can provide more stringent maintenance standards.

As described above, the manufacturer of the control valve device 1, the manufacturer of the transportation equipment in which the control valve device 1 is mounted, the user of the transportation equipment, or the maintenance engineer checks information displayed on the display unit 4 as a result of an oil vibration diagnosis after the countermeasure process has been performed. In this embodiment, therefore, an oil vibration diagnosis including measuring a pressure by using a pressure sensor, determining the duration time of the oil vibration state, and outputting a diagnostic result by using an output unit is executed both before and after the countermeasure process. This enables a change in occurrence and continuation of oil vibration before and after the countermeasure process to be recognized. Thus, it is possible to verify the effectiveness of the countermeasure process.

The memory 302 of the diagnostic processing unit 3 stores warning information generated by the display content generation unit 37 or the like. Thus, the warning information or the like stored in the memory 302 is checked during a regular check or the like, rather than immediately after warning information or the like is displayed, thereby enabling occurrence or continuation of oil vibration for a period until the regular check to be recognized, which is useful for countermeasure development.

Figure 7:
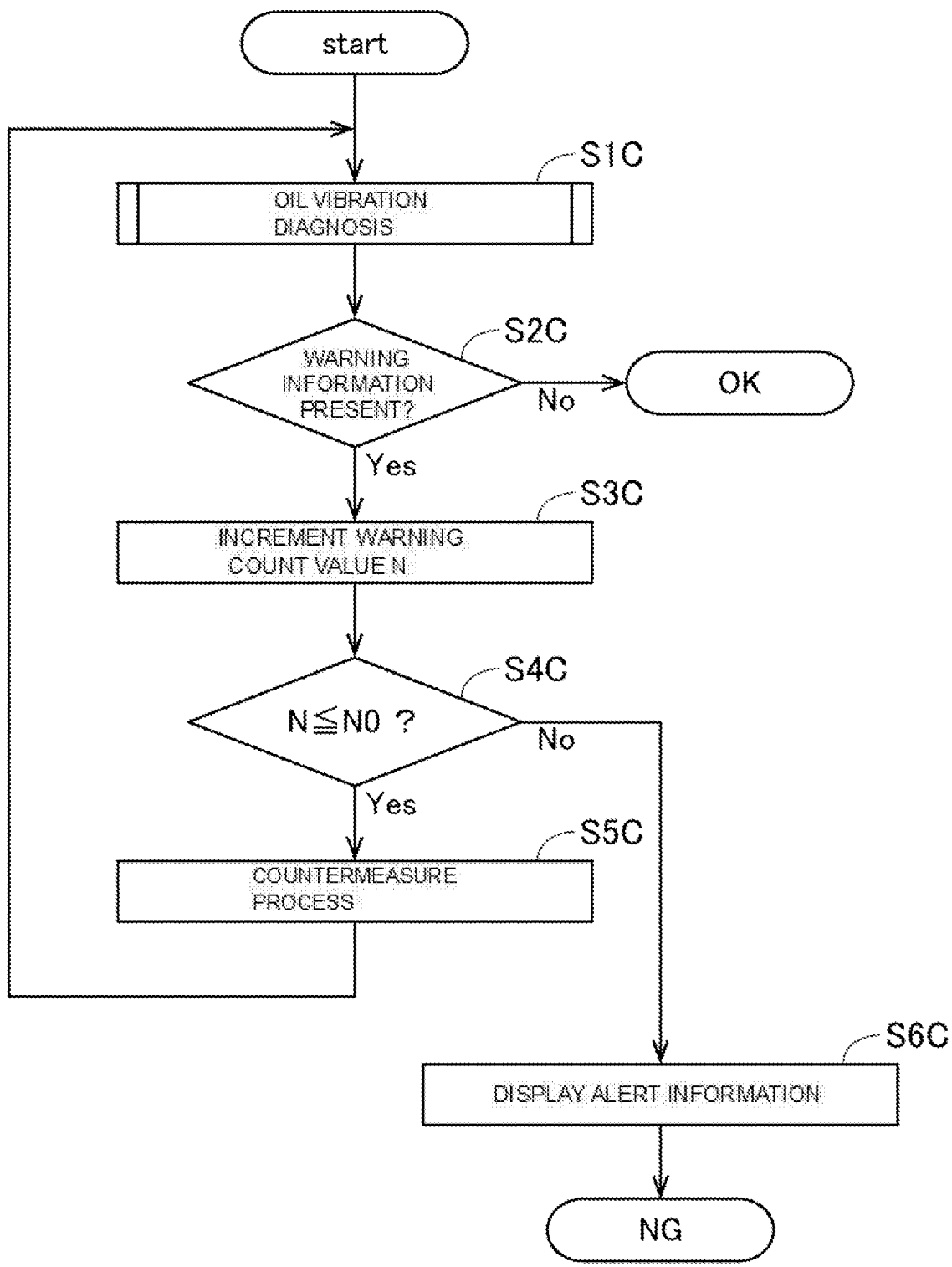
FIG. 7 is a flowchart illustrating the flow of an oil vibration diagnosis and a countermeasure process according to a modification.

In addition, as illustrated in FIG. 2, the warning counting unit 38 of the diagnostic processing unit 3 counts the number of times warning information has been output. Here, the oil vibration diagnosis and the countermeasure process may be performed in accordance with the flow illustrated in FIG. 7 instead of the flow illustrated in FIG. 4 described above. In the flow illustrated in FIG. 7, when the first warning information or the second warning information is displayed on the display unit 4 (when Yes is determined in step S2C), the warning counting unit 38 in the diagnostic processing unit 3 increments a warning count value N indicating the number of times the first warning information or the second warning information has been successively output (step S3C). Then, the diagnostic processing unit 3 checks whether the incremented warning count value N is less than or equal to a preset threshold N0 (step S4C). When the warning count value N exceeds the preset threshold N0 (when N0 is determined in step S4C), the display content generation unit 37 generates alert information different from the first warning information or the second warning information and displays the alert information on the display unit in addition to the first warning information or the second warning information (step S6C). This enables the user of the transportation equipment or the maintenance engineer to check the alert information and to examine a method different from a countermeasure process performed at routine checks.

If the diagnostic result is not improved even though the oil vibration diagnosis and the countermeasure process are repeatedly performed, the same warning information is displayed a plurality of times. Then, the warning count value N exceeds the threshold N0 after some time has passed. When the warning count value N exceeds the threshold N0 in step S4C, the display content generation unit 37 outputs alert information different from the first warning information and the second warning information to the display unit 4. Accordingly, the alert information is displayed on the display unit 4 (step S6C). The alert information indicates that the oil vibration is outside the normal range although the countermeasure process has been repeatedly performed. When the alert information is displayed on the display unit 4, the manufacturer of the control valve device 1, the manufacturer of the transportation equipment in which the control valve device 1 is mounted, the user of the transportation equipment, or the maintenance engineer judges that the oil vibration is difficult to improve and stops the countermeasure process.

While an exemplary embodiment of the present invention has been described, the present invention is not limited to the embodiment described above.

Figure 8:
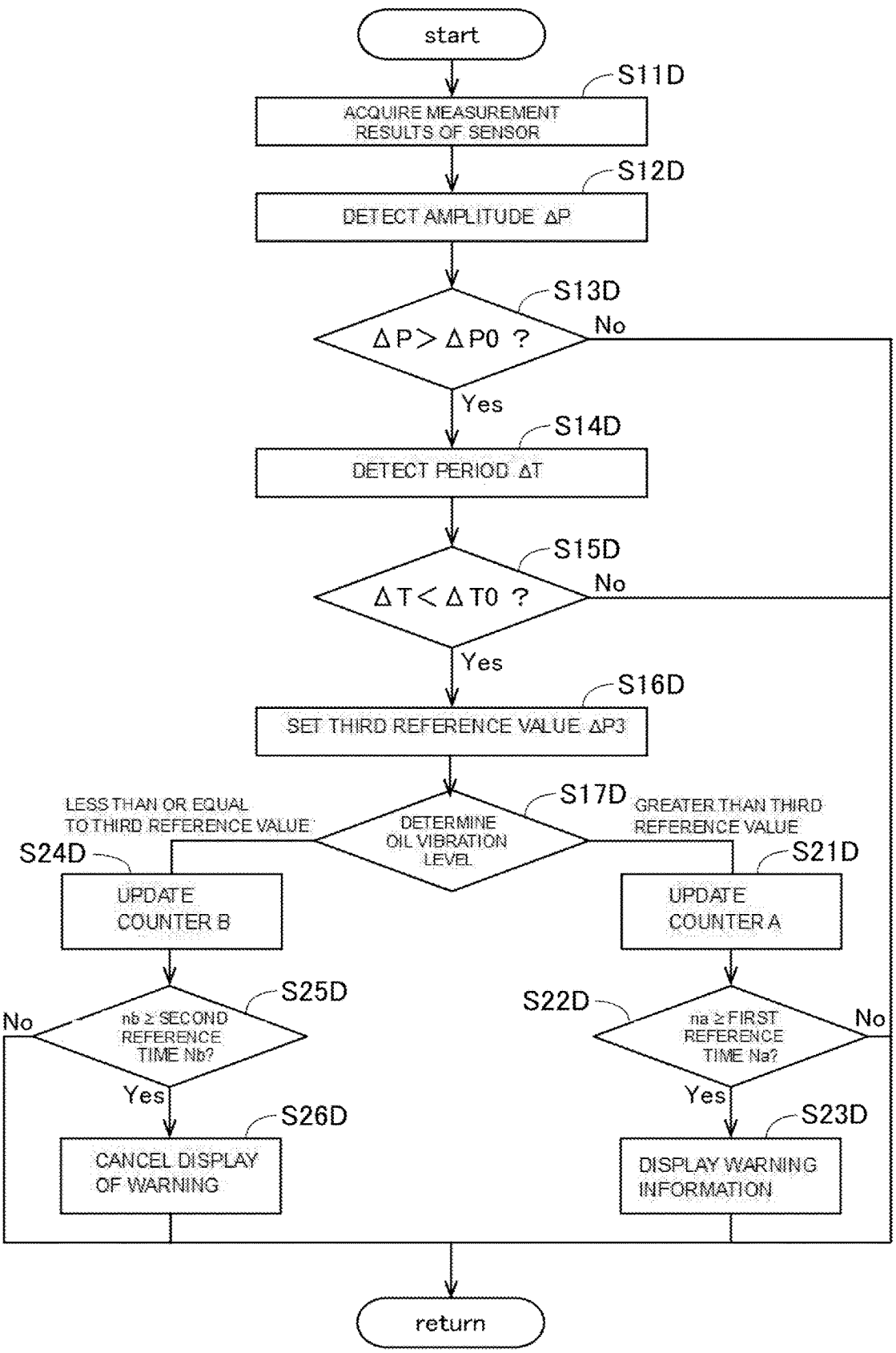
FIG. 8 is a flowchart illustrating the details of an oil vibration diagnosis according to a modification.

For example, in the embodiment described above, the diagnosis unit 34 determines any of the three levels, namely, the zeroth to second levels, as the oil vibration level. However, the number of oil vibration levels may be two or may be four or more. As illustrated in FIG. 8, if it is judged that oil vibration has occurred, the diagnosis unit 34 may diagnose any one of two levels as the oil vibration level on the basis of the relationship in magnitude between the amplitude ΔP of pressure fluctuations and a third reference amplitude value ΔP3. In the embodiment described above, furthermore, the display content generation unit 37 is capable of outputting warning information having two levels, namely, the first warning information and the second warning information. However, the display content generation unit 37 may output warning information having three or more levels in accordance with the oil vibration level.

Figure 9:
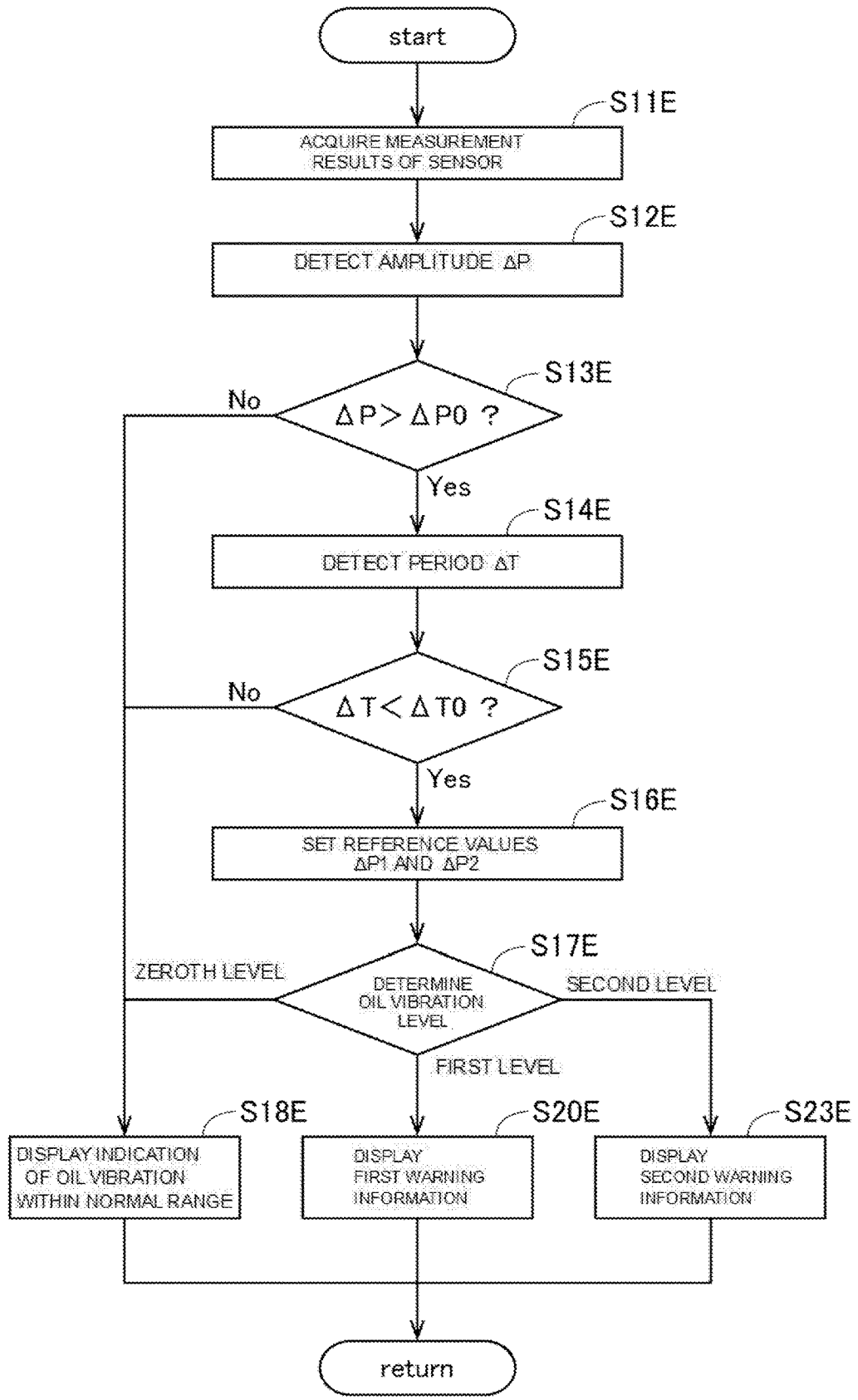
FIG. 9 is a flowchart illustrating the details of an oil vibration diagnosis according to a modification.

Alternatively, as illustrated in FIG. 9, the determination of the duration time of the oil vibration state with the second level by using the oil vibration state duration time determination unit 35 and the determination of the duration time of the oil non-vibration state by using the oil non-vibration state duration time determination unit 36 may be omitted. After the diagnosis unit 34 determines any one of the three levels, namely, the zeroth to second levels, as the oil vibration level, warning display may be provided on the basis of the determination result.

Figure 10:
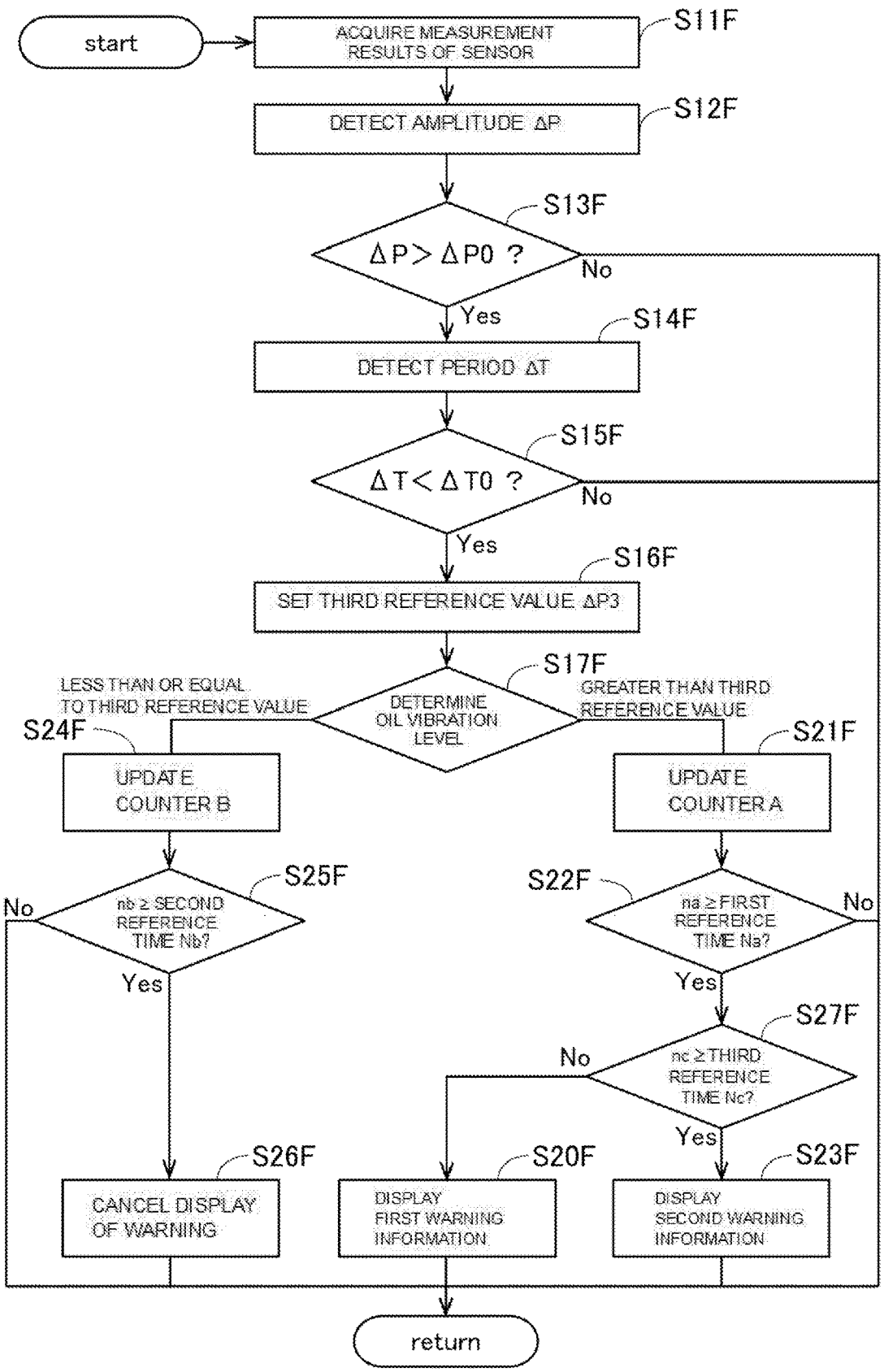
FIG. 10 is a flowchart illustrating the details of an oil vibration diagnosis according to a modification.

Alternatively, as illustrated in FIG. 10, as a result of the determination of the duration time of the oil vibration state with the second level by the oil vibration state duration time determination unit 35, if the oil vibration state with the second level continues for a period greater than or equal to the first reference time Na, it may further be determined whether the oil vibration state with the second level continues for a period greater than or equal to a third reference time Nc longer than the first reference time Na (step S27F). When the oil vibration state with the second level continues for a period greater than or equal to the third reference time Nc longer than the first reference time Na, further different warning information may be displayed. This makes it possible to easily determine urgency of the countermeasure process. In this way, different warning information is displayed depending on the duration time of the oil vibration rather than depending on the oil vibration level, which enables more detailed measures to be taken against the oil vibration.

In the oil vibration diagnosis according to the embodiment described above, furthermore, first, the presence or absence of oil vibration is determined (steps S12 to S15) and, then, the oil vibration level is determined (steps S16 to S17). However, the determination of the presence or absence of oil vibration may be omitted and only the determination of the oil vibration level may be performed. That is, a state in which no oil vibration occurs may also be determined as one oil vibration level.

The present invention is applicable to an oil vibration diagnosis apparatus and an oil vibration diagnosis method for diagnosing occurrence and continuation of oil vibration within an oil passage in a control valve device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An oil vibration diagnosis apparatus for diagnosing occurrence of oil vibration within an oil passage in a control valve device, the oil vibration diagnosis apparatus comprising:
    a pressure sensor that measures a pressure of oil within the oil passage;
    an amplitude detection unit that detects an amplitude of pressure fluctuations on the basis of a measurement result of the pressure sensor;
    a period detection unit that detects a period of pressure fluctuations on the basis of the measurement result of the pressure sensor;
    a diagnosis unit that diagnoses an oil vibration state or an oil non-vibration state on the basis of the amplitude and the period;
    an oil vibration state duration time determination unit that determines a duration time of the oil vibration state on the basis of a diagnostic result of the diagnosis unit; and
    an output unit that outputs information on the basis of a determination result of the oil vibration state duration time determination unit,
    wherein the diagnosis unit diagnoses the oil vibration state when the amplitude is greater than a reference amplitude value and when the period is less than a reference period value, and
    wherein the output unit outputs warning information when the oil vibration state duration time determination unit determines continuation of the oil vibration state for a period greater than or equal to a first reference time.

2. The oil vibration diagnosis apparatus according to claim 1, further comprising
    an oil non-vibration state duration time determination unit that determines a duration time of the oil non-vibration state on the basis of the diagnostic result of the diagnosis unit,
    wherein the diagnosis unit further diagnoses the oil non-vibration state when the amplitude is less than or equal to the reference amplitude value or when the period is greater than or equal to the reference period value, and
    wherein the output unit cancels output of the warning information when the oil non-vibration state duration time determination unit determines continuation of the oil non-vibration state for a period greater than or equal to a second reference time.

3. The oil vibration diagnosis apparatus according to claim 1, further comprising an oil non-vibration state duration time determination unit that determines a duration time of the oil non-vibration state on the basis of the diagnostic result of the diagnosis unit, wherein the diagnosis unit further diagnoses the oil non-vibration state when the amplitude is less than or equal to the reference amplitude value or when the period is greater than or equal to the reference period value, and wherein the output unit outputs cancellation information when the oil non-vibration state duration time determination unit determines continuation of the oil non-vibration state for a period greater than or equal to a second reference time.

4. The oil vibration diagnosis apparatus according to claim 2, wherein the second reference time is greater than or equal to the first reference time.

5. The oil vibration diagnosis apparatus according to claim 1, wherein the diagnosis unit further diagnoses a first level as an oil vibration occurrence level when the amplitude is greater than or equal to a first reference amplitude value and is less than a second reference amplitude value greater than the first reference amplitude value, and diagnoses a second level as the oil vibration occurrence level when the amplitude is greater than or equal to the second reference amplitude value, and wherein the output unit outputs first warning information when the diagnosis unit diagnoses the first level, and outputs second warning information when the diagnosis unit diagnoses the second level and when the oil vibration state duration time determination unit determines continuation of the oil vibration state with the second level for a period greater than or equal to the first reference time.

6. The oil vibration diagnosis apparatus according to claim 5, wherein the first warning information and the second warning information include numerical information necessary for a countermeasure process to reduce an oil vibration level.

7. The oil vibration diagnosis apparatus according to claim 6, wherein measurement of the pressure by the pressure sensor, detection of the amplitude by the amplitude detection unit, detection of the period by the period detection unit, a diagnosis of whether oil vibration has occurred and a diagnosis of the oil vibration level, which are made by the diagnosis unit, determination of the duration time of the oil vibration state by the oil vibration state duration time determination unit, and output of information by the output unit are performed before and after the countermeasure process.

8. The oil vibration diagnosis apparatus according to claim 7, further comprising a counting unit that counts the number of times the output unit has output identical warning information, wherein the output unit outputs alert information different from the first warning information and the second warning information when a count value obtained by the counting unit exceeds a preset threshold.

9. The oil vibration diagnosis apparatus according to claim 1, wherein the diagnosis unit diagnoses a zeroth level as an oil vibration level when the amplitude is less than the reference amplitude value, and wherein the output unit outputs information indicating that the oil vibration is within a normal range when the diagnosis unit determines the zeroth level.

10. The oil vibration diagnosis apparatus according to claim 1, wherein the output unit includes a display unit that displays the warning information on a screen thereof.

11. The oil vibration diagnosis apparatus according to claim 1, further comprising
a memory that stores the warning information.

12. An oil vibration diagnosis method for diagnosing occurrence of oil vibration within an oil passage in a control valve device, the oil vibration diagnosis method comprising:
a step (a) of measuring a pressure of oil within the oil passage;
a step (b) of detecting an amplitude of pressure fluctuations on the basis of a measurement result obtained in the step (a);
a step (c) of detecting a period of pressure fluctuations on the basis of the measurement result obtained in the step (a);
a step (d) of diagnosing an oil vibration state or an oil non-vibration state on the basis of the amplitude obtained in the step (b) and on the basis of the period obtained in the step (c);
a step (e) of determining a duration time of the oil vibration state on the basis of a diagnostic result in the step (d); and
a step (f) of outputting information on the basis of a determination result in the step (e),
wherein, in the step (d), the oil vibration state is diagnosed when the amplitude is greater than a reference amplitude value and when the period is less than a reference period value, and
wherein, in the step (f), warning information is output when continuation of the oil vibration state for a period greater than or equal to a first reference time is determined in the step (e).

13. The oil vibration diagnosis method according to claim 12, further comprising
a step (g), between the step (d) and the step (f), of determining a duration time of the oil non-vibration state on the basis of the diagnostic result in the step (d),
wherein, in the step (d), the oil non-vibration state is further diagnosed when the amplitude is less than or equal to the reference amplitude value or when the period is greater than or equal to the reference period value, and
wherein, in the step (f), output of the warning information is canceled when continuation of the oil non-vibration state for a period greater than or equal to a second reference time is determined in the step (g).

14. The oil vibration diagnosis method according to claim 12, further comprising
a step (g), between the step (d) and the step (f), of determining a duration time of the oil non-vibration state on the basis of the diagnostic result in the step (d),
wherein, in the step (d), the oil non-vibration state is further diagnosed when the amplitude is less than or equal to the reference amplitude value or when the period is greater than or equal to the reference period value, and
wherein, in the step (f), cancellation information is output when continuation of the oil non-vibration state for a period greater than or equal to a second reference time is determined in the step (g).

15. The oil vibration diagnosis method according to claim 13, wherein the second reference time is greater than or equal to the first reference time.

16. The oil vibration diagnosis method according to claim 12, wherein, further in the step (d), a first level is diagnosed as an oil vibration occurrence level when the amplitude is greater than or equal to a first reference amplitude value and is less than a second reference amplitude value greater than the first reference amplitude value, and a second level is diagnosed as the oil vibration occurrence level when the amplitude is greater than or equal to the second reference amplitude value, and wherein, in the step (f), first warning information is output when the first level is diagnosed in the step (d), and second warning information is output when the second level is diagnosed in the step (d) and when continuation of the oil vibration state with the second level for a period greater than or equal to the first reference time is determined in the step (e).

17. The oil vibration diagnosis method according to claim 16, wherein the first warning information and the second warning information include numerical information necessary for a countermeasure process to reduce an oil vibration level.

18. The oil vibration diagnosis method according to claim 17, wherein the step (a), the step (b), the step (c), the step (d), the step (e), and the step (f) are performed before and after the countermeasure process.

19. The oil vibration diagnosis method according to claim 18, wherein the number of times identical warning information has been output in the step (f) is counted, and wherein alert information different from the first warning information and the second warning information is output when a count value exceeds a preset threshold.

20. The oil vibration diagnosis method according to claim 16, wherein, in the step (d), a zeroth level is diagnosed as the oil vibration occurrence level when the amplitude is less than the first reference amplitude value, and wherein, in the step (f), information indicating that the oil vibration is within a normal range is output when the zeroth level is determined in the step (d).

21. The oil vibration diagnosis method according to claim 12, wherein, in the step (f), the warning information is displayed on a screen of a display unit.

22. The oil vibration diagnosis method according to claim 12, wherein the warning information is further stored in a memory.

* * * * *